United States Patent [19]

Gassner

[11] 4,392,092
[45] Jul. 5, 1983

[54] OSCILLATING-ARMATURE MOTOR FOR ELECTRIC DRYSHAVERS AND THE LIKE

[75] Inventor: Gustav Gassner, Kelkheim, Fed. Rep. of Germany

[73] Assignee: Braun Aktiengesellschaft, Frankfurt am Main, Fed. Rep. of Germany

[21] Appl. No.: 219,384

[22] Filed: Dec. 22, 1980

Related U.S. Application Data

[63] Continuation of Ser. No. 959,188, Nov. 7, 1978, abandoned.

[30] Foreign Application Priority Data

Dec. 2, 1977 [DE] Fed. Rep. of Germany ....... 2753749

[51] Int. Cl.³ .......................................... H02K 33/00
[52] U.S. Cl. .................................. 318/127; 318/128; 318/129; 318/130
[58] Field of Search ................ 30/42, 45, 43.7, 43.91, 30/43.92, DIG. 2; 318/119, 125, 127, 129, 130, 132, 128; 310/15, 29, 32, 19, 21, 36–39

[56] References Cited

U.S. PATENT DOCUMENTS

| | | | |
|---|---|---|---|
| 3,026,458 | 3/1962 | Freystedt et al. | 318/130 X |
| 3,147,419 | 9/1964 | Cope | 318/129 |
| 3,218,793 | 11/1965 | Walton | 318/129 X |
| 3,268,786 | 8/1960 | Reich | 318/130 X |
| 3,296,468 | 1/1967 | Townshend | 310/38 X |
| 3,308,298 | 3/1967 | Rawls et al. | 318/129 X |
| 3,316,470 | 4/1967 | Scott | 318/130 |
| 3,454,957 | 7/1969 | Chaplenko | 318/128 X |
| 3,474,314 | 10/1969 | Reijiro et al. | 318/128 |
| 3,480,848 | 11/1969 | Church | 30/45 |
| 3,840,789 | 10/1974 | Dion | 318/728 |
| 3,898,732 | 8/1975 | Krainer | 310/29 X |

*Primary Examiner*—Ulysses Weldon
*Attorney, Agent, or Firm*—Michael J. Striker

[57] ABSTRACT

An oscillating-armature electric motor comprises an armature which, during operation of the motor, moves along a path of oscillatory movement that includes a substantial range of movement in which the armature poles are located remote from the stator poles. When the poles are remote from each other, the efficiency of electrical to mechanical energy conversion would be low. The stator winding is energized in dependence upon the position of the motor, to avoid wasteful electrical energy dissipation during that part of the armature swing in which the aforementioned efficiency would be low. During the part of the armature swing in which the efficiency is high, the energization is great enough to establish a range of armature movement which goes beyond the high-efficiency armature positions to predominantly comprise low-efficiency armature positions.

3 Claims, 6 Drawing Figures

OSCILLATING-ARMATURE MOTOR FOR ELECTRIC DRYSHAVERS AND THE LIKE

This is a continuation of application Ser. No. 959,188, filed Nov. 7, 1978 now abandoned.

BACKGROUND OF THE INVENTION

The present invention concerns oscillating-armature electric motors, of the type typically used in electric dryshavers, and comprised of an armature mounted for swinging motion and a stator provided with a winding which is electrically energized, e.g., by alternating current, to impart swinging motion to the armature. In dryshavers, the armature is coupled to and vibrates the cutting block beneath the apertured cutting head of the shaver.

Oscillating-armature electric motors are most typically used where high electromechanical efficiency is required. Their high efficiency results from the fact that they are normally designed to have a mechanical-oscillation resonant frequency very close to the frequency of the energizing current employed.

Various types of oscillating-armature motors have been developed, some with and others without the use of auxiliary permanent magnets; see e.g., "Der Elektroniker," 1967, No. 5, pp. 251-255. These oscillating-armature motors tend to require relatively large stator windings, so that the space consumed by the motor itself may become not inconsiderable. Also, and in many instances more importantly, these motors, along with the high efficiency referred to above, nevertheless additionally exhibit very high levels of wasteful electrical power dissipation, i.e., power dissipation not significantly contributing to the development of mechanical driving force. Oscillating-armature motors specially designed to drive small dryshavers are likewise known; see e.g., W. Klenk, "Zur Theorie des Schwingankermotors für Elektrorasierer," Diss. Univ. (TH) Stuttgart, 1971, page 96. However these, in the same sense, tend to require relatively large stator windings and exhibit rather high levels of wasteful power dissipation.

The Philips Corporation "Technische Rundschau," 33, 1973/1974 discloses oscillating-armature motors, with and without the use of permanent magnets, designed for use in refrigerator compressors and in dryshavers, and in FIG. 7 on page 262 of that publication, an informative graph is provided for a motor intended for dryshaver use, showing the variation with respect to time of the position of the oscillating armature, of the energizing current, of the motor flux and of the electromagnetic force produced. If one compares the time-variation of armature position against the time-variation of energizing current, it becomes apparent that energizing current is very much flowing even when the magnetic poles of the swinging armature are located very remote from the magnetic poles of the stator. This is disadvantageous because, due to the high magnetic resistance presented by the very sizable air gap which forms when the armature poles are remote from the stator poles, the magnetic field resulting from electrical energization is actually highly effective for the production of electromagnetic force only during about one third of the armature's swing. During the remaining two thirds or so of the armature's swing, the electrical energy furnished to the motor is mainly converted into heat.

Attempts to reduce the amount of wasteful power dissipation have already been made. For example, in the publication by Adolf Wilhelm Mohr, "Über die günstigste Gestaltung von Schwinganker-Rasiermotoren," ETZ-A, Volume 82, Book 26 of Dec. 18, 1961, pp. 852–855, this is attempted by designing the field versus armature-position profile in a very special manner. The profile there considered best is shown in FIG. 7 of that article and is partly straight-line and partly hyperbolic in configuration; i.e., the air gap varies with armature position at first linearly and then has a hyperbolic merge in the constant air gap. With this so-called best field profile there nevertheless continues to be a relatively high level of wasteful power dissipation during the part of the armature swing in which the armature is located remote from the stator.

German published patent application 1,488,056 discloses an oscillating-armature electric motor in which the amplitude of the armature swing is maintained constant independently of the mechanical load applied to the motor and independently of the driving voltage applied to the motor. In this motor, the magnetic pole surfaces are of different sizes proceeding in the direction of armature movement. However, this expedient does not actually serve to substantially reduce the wasteful power dissipation in question.

It should be noted that the problem in question does not exist with all oscillating-armature electrical motors. For example, French Pat. Nos. 1,604,481 and 2,268,386 disclose motors in which the armature has two magnetic poles but the stator has three. The latter are so disposed that, throughout the armature swing, the two magnetic poles of the armature are close to the first and middle pole of the stator or else to the middle and third pole of the stator. The stator winding is constantly connected to voltage.

German published allowed patent application 1,262,431 describes an oscillating-armature electric motor in which the motor is not constantly energized, because the motor is to be operated at an oscillatory frequency different from the available line frequency, e.g., an oscillatory frequency of 25 Hz derived from an available line frequency of 50 or 60 Hz. With the motor-energization circuit there disclosed, if the mechanical oscillatory frequency is to be, e.g., one-half the line frequency, then the motor is energized only during every second A.C. voltage cycle, and is unenergized during the intervening A.C. voltage cycles. There is no particular relationship or correlation between the energization phases of the motor, on the one hand, and the phases of the armature's swing and of the armature's distance from the state, on the other hand.

SUMMARY OF THE INVENTION

It is accordingly a general object of the present invention to provide an oscillating-armature electric motor, designed for a mode of operation in which the problem of wasteful power dissipation would exist, but with means provided for preventing this wasteful power dissipation.

In accordance with the present invention, this can be achieved by energizing the oscillating-armature electric motor only during that part of its armature swing in which an efficient conversion of electrical energy into mechanical energy can occur.

Thus, in an oscillating-armature electric motor controlled in accordance with the present invention, the armature, i.e., during operation, has a swing amplitude such that the armature swing path includes ranges of armature position in which the magnetic coupling between the magnetic poles of armature and stator are low, corresponding to low efficiency in electrical-to-mechanical energy conversion, but the stator winding is not energized during these intervals of the actual armature swing; of course, if the armature swing amplitude resulting during actual operation did not include sizable ranges of low magnetic coupling, the problem in question would not exist to begin with.

Among the considerable advantages resulting from the inventive technique are the following. The overall efficiency in the conversion from electrical to mechanical energy is markedly increased. The stator winding becomes heated to a markedly reduced extent. And, if a given output mechanical power is to be derived from a given input electrical power, this can be accomplished using a smaller and lighter stator structure than would be necessary in the prior art.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
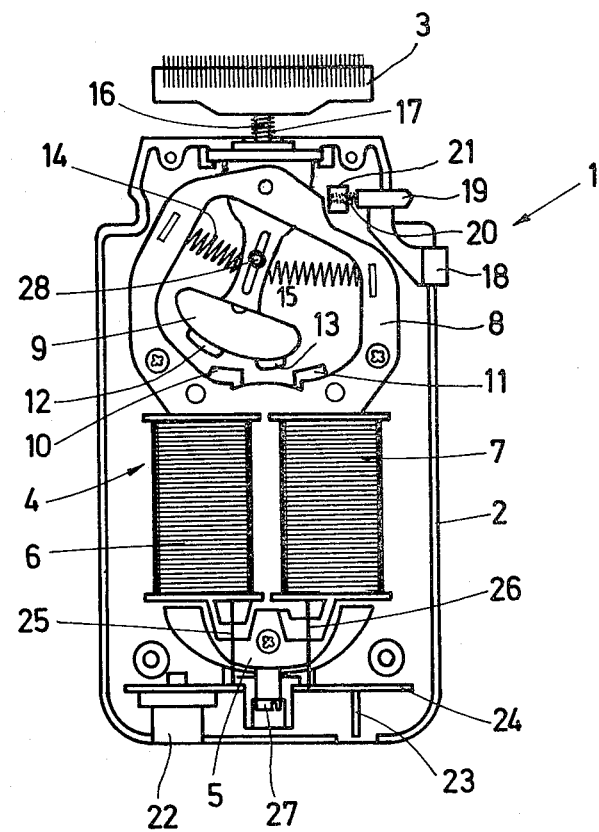
FIG. 1 is a longitudinal section through an electric dryshaver provided with an oscillating-armature electric drive motor.

In FIG. 1, numeral 1 denotes in toto an electric dryshaver, from which the apertured cutting head has been removed. The shaver 1 comprises a housing 2 provided at its upper end with a cutter block 3 driven by an oscillating-armature electric motor 4 in the interior of housing 2.

Oscillating-armature motor 4 includes a stator mainly comprising a two-legged soft-iron stator core 5 around which two stator coils 6, 7 are wound, and an armature mounting arrangement 8 mounting the swinging motor armature 9. The soft-iron stator core 5 terminates at its upper end in two stator poles 10 and 11, and swinging armature 9 has two magnetic poles 12, 13 which face the stator poles 10, 11 at a slant. Armature 9 is braced in mounting arrangement 8 by means of two springs 14, 15. The armature 9 is coupled to the cutter block 3 via a pin 16 around which a spring 17 extends. Provided at the upper right corner of the shaver is a pushbutton 18 coupled to a latch 19. Latch 19 in turn is connected via a spring 20 to a mount 21. Pushbutton 18 is depressed by the user when it is desired to remove the (non-illustrated) apertured cutting head from the shaver; depression of pushbutton 18 causes latch 19 to retract inwards, thereby permitting such removal.

The lower end of the shaver 1 is provided with a voltage changeover switch 22 and electrical connectors 23, to which can be connected a power supply line plugged into an electrical outlet. These are mounted on a support plate 24. Electrical lines 25, 26 extend from support plate 24 to the stator coils 6, 7. Also the shaver is provided with an on-off switch 27 for switching on and off the supply of A.C. wall outlet voltage, and a drive pin 28 which can drive a (non-illustrated) hair-trimming attachment.

If by means of on-off switch 27, the A.C. wall outlet voltage is applied to stator coils 6, 7, then, due to the oscillating magnetic field at the stator poles 10, 11, the armature 9 commences to swing back and forth. This oscillatory motion is transmitted via coupling pin 16 to the cutter block 3, which latter oscillates horizontally just below the (non-illustrated) apertured cutting head.

When the armature poles 12,13 are at a relatively great distance from the stator poles 10, 11, the magnetic resistance of the air gap between the poles 10, 12 and 11, 13 is relatively large. Accordingly, a correspondingly greater energizing current must flow through the stator coils 6, 7, if a given electromagnetic force is to be established at this point. I.e., at this point, the electrical energy supplied to the oscillating-armature motor is mainly converted into heat in the soft-iron core 5 and in the stator coils 6, 7. Only when the armature poles 12, 13 have come near to the stator poles 10, 11, is the electrical energy supplied to the motor converted into kinetic energy with any high degree of efficiency. In the case of the dryshaver depicted in FIG. 1, there is approximately a 1.3 ratio between, on the one hand, the duration of the fraction of an operating cycle during which conversion from electrical to kinetic energy can be performed with high efficiency, and, on the other hand, the duration of the fraction of the operating cycle during which such conversion can be performed only with low efficiency.

In order that this ratio not characterize the overall efficiency of the motor during operation, A.C. voltage is not continuously applied across the stator coils 6, 7. Instead, A.C. voltage is applied across coils 6, 7 during only preselected angular intervals of the A.C. supply voltage, these angular intervals being predesigned such that conversion of electrical energy into kinetic energy occurs only during that part of the armature's swing in which such conversion can occur efficiently.

Because energizing current here flows through stator coils 6, 7 during only a relatively small fraction of the armature's total swing—i.e., at the times when the armature poles 12, 13 are just about to reach the stator poles 10, 11 through to the point at which armature poles 12, 13 directly face stator poles 10, 11—, the amount of electrical energy supplied to the motor during this fraction of the armature's swing must be made high enough to assure that the armature will in fact swing considerably beyond such range, to either side thereof, into ranges of positions in which the energy conversion efficiency would be poor, i.e., poor if electrical energization were actually performed there. Elevating the amount of energy supplied can be accomplished by increasing the number of ampere-turns of the stator coils.

Figure 2:
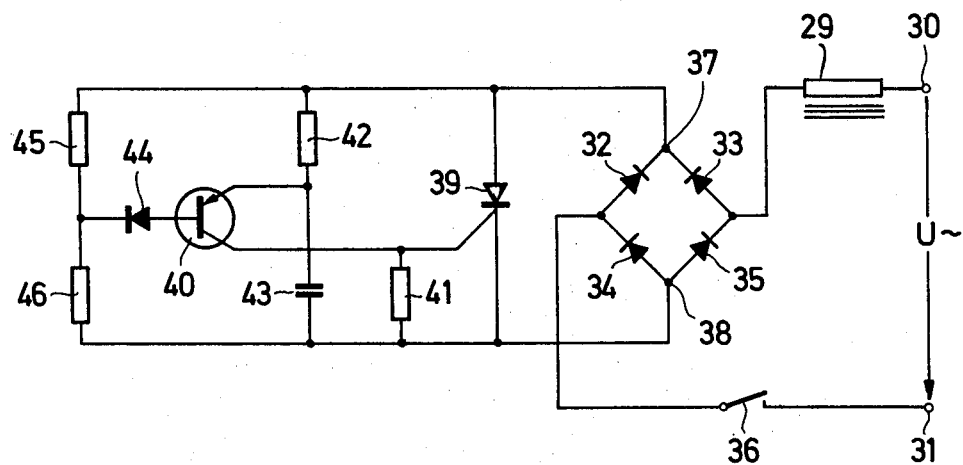
FIG. 2 depicts an electronic control circuit controlling the energization of the stator winding of the oscillating-armature motor.

In accordance with one embodiment of the invention, this armature-position dependent energization technique involves the use of an energization-control circuit of the firing-angle control type. FIG. 2 depicts such a circuit, and further details concerning such circuits can be had, for example, from the Intermetall Company publication "Thyristoren, Triacs, Triggerdioden, Grundlagen und Anwendungen," 1976, page 90.

The oscillating-armature motor is denoted by numeral 29 in FIG. 2. One motor terminal is connected to one terminal 30 of the two A.C. voltage supply terminals 30, 31, and the other motor terminal is connected to a rectifier comprising four diodes 32, 33, 34, 35. A switch 36 is connected analogously to motor 29 but to the other A.C. voltage supply terminal 31. A thyristor or SCR 39 is connected across the two D.C.-voltage junctions 37, 38 of the rectifier, its cathode being connected to junction 38 and its gate to the collector of a transistor 40. A resistor 41 is connected across the gate and cathode terminals of thyristor 39.

The emitter of transistor 40 is connected to the junction between a resistor 42 and a capacitor 43, the other terminal of resistor 42 being connected to rectifier junction 37, and the other terminal of capacitor 43 being connected to rectifier junction 38.

The base of transistor 40 is connected to the anode of a diode 44, whose cathode is connected to the junction of two resistors 45 and 46, the other terminals of resistors 45, 46 being connected to rectifier junctions 37 and 38, respectively.

Resistors 45, 46, 42 and capacitor 43 form a bridge circuit whose diagonal contains the diode 44 and the base-emitter path of transistor 40. The firing angle of thyristor 39, i.e., the moment expressed as an angle at which thyristor 39 is rendered conductive, is determined by the RC time-constant behavior of the bridge circuit. Because of capacitor 43, the voltage across the right bridge branch, comprised of resistor 42 and capacitor 43, lags the voltage in the left bridge branch, comprised of resistors 45, 46. As a result, during the first half of each A.C. supply-voltage half-cycle, the base of transistor 40 is positive relative to its emitter and no collector current flows. Thyristor 39 is likewise non-conductive. At a certain moment during the second half of the half-cycle, this moment being determined by resistor 42, the diagonal voltage of the bridge circuit passes through zero and when, thereafter, the base of transistor 40 becomes somewhat negative relative to its emitter, collector current flows through transistor 40 and thyristor 39 is rendered conductive.

The circuit element values in FIG. 2 are so selected that only the last third of each current half-cycle is actually transmitted to motor 29, i.e., to the stator coils 6, 7 of FIG. 1. In other words, the motor is energized by current during each half-cycle, but only during the last third of such half-cycle, in this exemplary embodiment.

Figure 3:
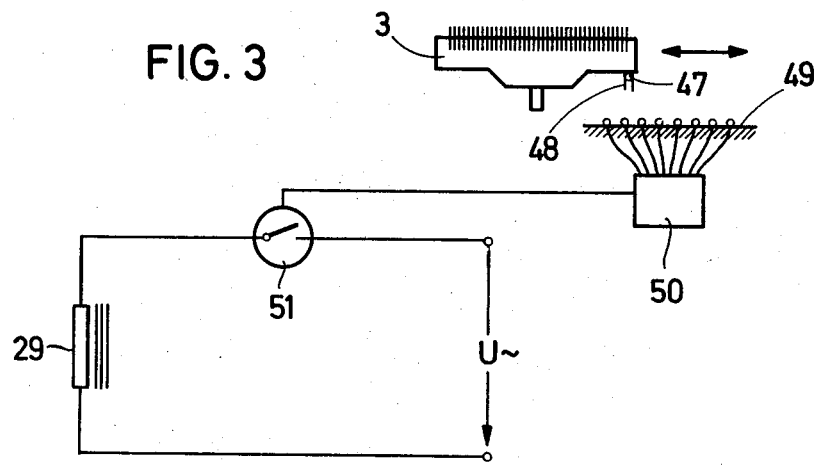
FIG. 3 depicts a control circuit in which stator energization is controlled by sensing means positively sensing the position of the swinging armature.

FIG. 3 depicts an alternative energization control circuit, incorporating means for positively sensing the position of the swinging armature. The cutter block 3 is here provided with a light-emitting diode 47 located within a small tubular element 48. Tubular element 48 serves to form a fairly well defined downwardly directed light beam. Parallel to the horizontal path of motion of cutter block 3 is a horizontally extending row 49 of photosensitive elements, the individual outputs of which are connected to inputs of a position-evaluating circuit stage 50. The output of circuit stage 50 is connected to the control input of a controllable switch or gate circuit 51 which when conductive can apply the A.C. supply voltage to motor 29.

By means of LED 47 and the row 49 of photosensitive elements, it becomes possible to very precisely sense the position of the oscillating cutter block 3, i.e., to ascertain whether it is in a position displaced to the left or to the right. For example, when cutter block 3 is in a position displaced to the right, one of the photosensitive elements at the right end of row 49 will receive light from LED 47 and communicate corresponding position information to position-evaluating circuit stage 50. Circuit stage 50 renders gating circuit 51 conductive only in response to receipt of light by predetermined ones of the photosensitive elements. Accordingly, voltage is applied to the oscillating-armature motor only when the cutter block 3 is in certain predetermined positions.

Because the position of cutter block 3 stands in a predetermined and fixed relationship to the position of the armature poles 12, 13 (see FIG. 1), it becomes a simple matter to apply voltage to oscillating-armature motor 29 only when the armature poles 12, 13 and the stator poles 10, 11 are located close to each other.

FIG. 3 depicts the use of optical means for sensing armature position. However, it will be understood that other equivalent means can be used, e.g., of electrical or magnetic type. Likewise, it will be understood that it is not necessary to sense the armature position indirectly by sensing the position of cutter block 3; the armature position can be sensed directly in the same manner as just described, if desired, by providing a suitable position transducer on the armature 9.

Another technique, which has considerable significance in the context in question, is to use a magnetic-flux responsive transducer to sense the air-gap flux or the flux conducted through the magnetic-circuit iron, and then in dependence upon the sensed flux value to effect load-dependent control of motor energization.

A further technique having significance for the present context is to control the initiation and termination of motor energization in dependence upon the automatically measured values of iron losses, copper losses and stray-flux power losses. For example, if during one oscillatory period of armature movement the measured power loss exceeds a preselected threshold level, operating voltage can be switched on or off in automatic dependence thereon.

Finally, it will be understood that the invention is not limited to the use of an A.C. voltage source; D.C. voltage sources can be switched on and off in substantially the same manner.

Figure 4A:
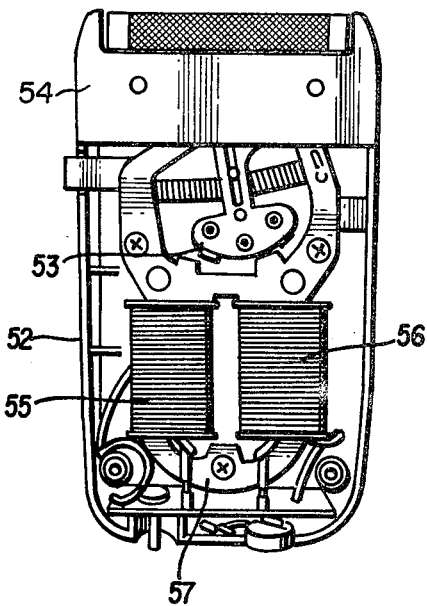
FIGS. 4a–4c depict three dryshavers, shown partly in section, two of which exhibit the reduction in stator size and weight made possible when the technique of the present invention is employed.
Figure 4B:
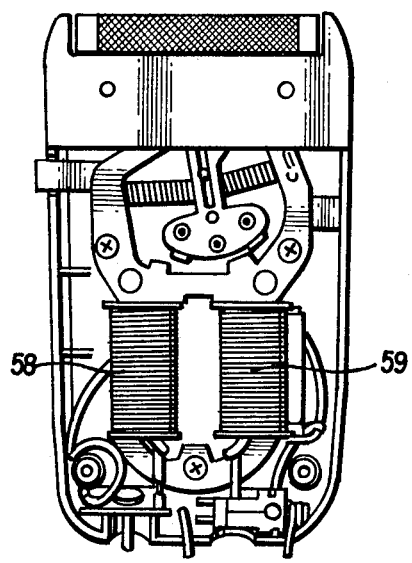
Figure 4C:
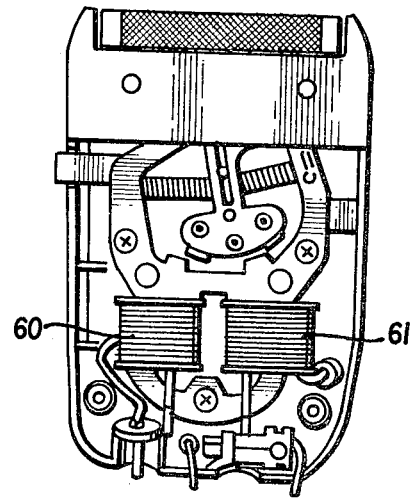

FIGS. 4a-4c are presented to make clear the practical significance of the present invention. It is to be noted that the three dryshavers illustrated are not exactly identical with the one presented in FIG. 1 for explanatory purposes.

FIG. 4a depicts a dryshaver of conventional design, of the type in which A.C. supply voltage is uninterruptedly applied to the stator windings. The shaver includes a housing 52, an armature 53, a cutting head 54, stator coils 55, 56 and a stator core 57. The stator coils 55, 56 are here relatively large, in order to establish the requisite ampere-turns value for the intended mode of operation of the dryshaver. For example, each stator coil has 4300 turns of 0.13 mm-diameter wire.

FIG. 4b depicts the same dryshaver as FIG. 4a, but with its energization controlled by the circuit of FIG. 2. With this shaver, the stator coils are of the same axial length as before, but of considerably reduced diameter, i.e., they are considerably slimmer. This reduction in coil diameter results from a reduction in the number of turns made possible by the lowered wasted power level.

FIG. 4c depicts a further variant, in which a reduction in the axial length of the stator coils is achieved. The number of turns is substantially reduced, e.g., down to 856 per coil, and the cross-sectional area of the coil wire is increased, e.g., up to 0.21 mm. Accordingly, during the short time interval during which operating voltage is applied to the stator coils, a higher current can be permitted to flow through the now thicker coil wire, in order to achieve the requisite number of ampere turns. The stator carrying the stator coils is shortened by about 15 mm, so that despite the reduction in the total length of the shaver, enough space is present for physically accommodating the circuit components of the circuit of FIG. 2.

It will be understood that each of the elements described above, or two or more together, may also find a useful application in other types of construction and circuits differing from the types described above.

While the invention has been illustrated and described as embodied in the context of particular types of dryshavers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A dryshaver, comprising a housing; a cutter block outwardly adjacent said housing and including a plurality of cutter blades; an electric motor mounted in said housing and comprising at least one respective electrical winding and having a pair of stator poles and at least one oscillatory armature carrying said cutter block and having a pair of armature poles; an electric current source for energizing said winding so that said armature is moved between one position in which the armature poles are closer to said stator poles and another position in which said armature poles are farther from the stator poles whereby said cutter block is moved by said armature between two positions; means for sensing each of said two positions of the cutter block and thus the positions of the armature relative to said stator, said position-sensing means being operative for generating a position signal, and a position-evaluating circuit means connected to said sensing means and to said source and responsive to said position signal, said position-evaluating circuit means being operative for effecting energization of said stator winding only when the armature poles are in said one position.

2. The dryshaver defined in claim 1, the position-sensing means comprising optoelectronic position-sensing means operative for sensing the position of the armature and generating an electrical position signal.

3. The dryshaver defined in claim 2, wherein said position-sensing means further comprising a controllable switch interconnected between said stator winding and said source and further connected to said position-evaluating circuit adapted to make said switch conductive in response to said position signal.

* * * * *